INVENTORS
Richard E. Thomas
Robert J. Florence
Clarence J. Shoemaker
by McDougall, Hersh,
Scott and Ladd
Attys

United States Patent Office 3,451,143
Patented June 24, 1969

3,451,143
SPIRIT DUPLICATION WITH VISIBLE AND CONCEALED IMAGES
Richard Edward Thomas, Chicago, Robert T. Florence, Park Ridge, and Clarence J. Shoemaker, Elmhurst, Ill., assignors to A. B. Dick Company, Niles, Ill., a corporation of Illinois
Filed Aug. 24, 1966, Ser. No. 574,743
Int. Cl. G09b 3/06; B41m 5/12, 5/22
U.S. Cl. 35—9                                                4 Claims

ABSTRACT OF THE DISCLOSURE

There is disclosed a multiple choice examination system wherein the test copy sheet has boxes thereon to be checked by the person under examination. The box representing the correct answer has a colorless color forming reactant within its area. The checking is done with a marking material containing another color forming reactant which forms a colored reaction product with the reactant within the box.

---

This invention relates to a method and materials for a new and improved multiple choice grading system or self-examination system and it relates more generally to a method and materials for the formation and development of latent, concealed images by a process which makes use of spirit duplication for the preparation of multiple copies.

To the present, various techniques have been devised for a learning program which makes use of self-examination material or a rapid grading system. In one such technique, use has been made of a stencil duplicating process wherein the stencil duplicating ink is formulated of a dyestuff in the preparation of copies for subsequent treatment of the dyestuff by the student with a solvent or chemical adapted to bleed color out of the dyestuff in the selected answer areas thereby clearly to indicate the election that has been made in answer to certain questions or conditions or facts. A system of the type described has been found to be expensive, cumbersome and it is generally unsatisfactory.

In another technique for rapid grading of multiple choice questions or for self-examination to determine if the subject has made the correct selection of an answer to a particular question, use is made of a template with areas cut out for registry over the correct selections. This has been found to be unsatisfactory in self-examination and it is not foolproof when used as a rapid grading system. In addition, the preparation of a template for each group of questions has been costly and inconvenient.

Thus it is an object of this invention to produce a new and improved self-examination and grading system which is easy and inexpensive, which gives satisfactory results and which is foolproof.

It is an object of this invention to produce a spirit system in the formation of a latent invisible image which is capable of being developed for visual examination in response to reactions with a marking fluid or a material subsequently applied and in which the invisible, concealed image can be deposited alone or in combination with visible images from the same or from different spirit masters.

These and other objects and advantages of this invention will hereinafter appear and, for purposes of illustration, but not of limitation, an embodiment of the invention is shown in the accompanying drawing, in which—

Figure 1:
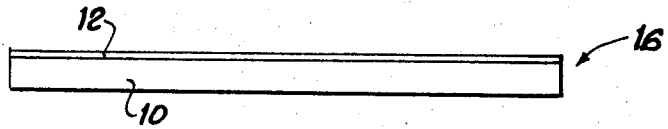
FIG. 1 is a sectional elevational view of a transfer sheet in which the transfer coating contains a sealed, spirit soluble component capable of color change or development in response to the reaction with a developing or marking fluid or material.
Figure 2:
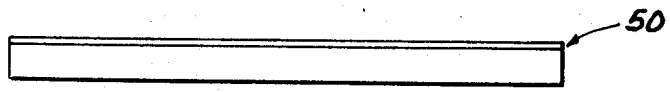
FIG. 2 is a sectional elevational view of a transfer sheet of an alcohol and/or water soluble dyestuff for conventional use in imaging a conventional spirit master.
Figure 3:
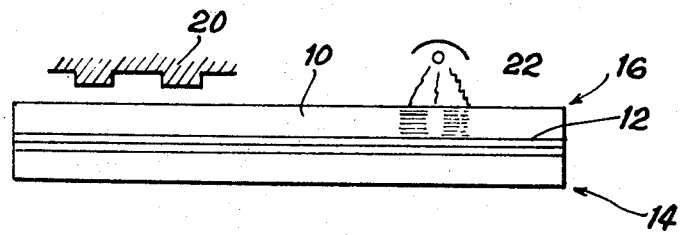
FIG. 3 is a sectional elevational view showing the arrangement of elements for imaging a spirit master with the transfer sheet of FIGS. 1 and 2.
Figure 4:
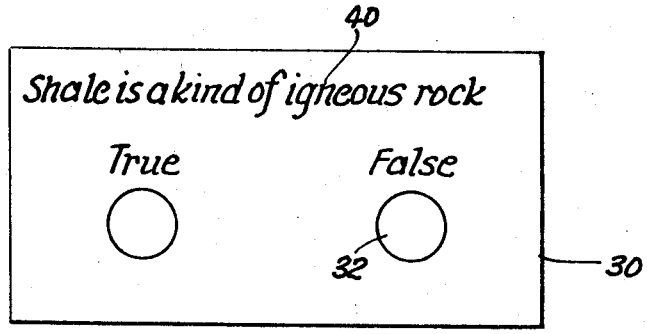
FIG. 4 is a top plan view of a copy sheet imaged with the imaged master of FIG. 3.
Figure 5:
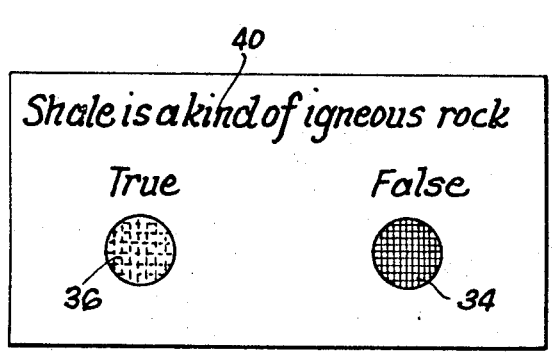
FIG. 5 is a top plan view of the copy sheet of FIG. 4 in which a selection has been made for the answer to a question.

In accordance with the practice of this invention, use is made of a transfer sheet in the form of a base paper 10 having a transfer coating 12 on one surface in which the transfer coating is formulated to contain an alcohol and/or water soluble, substantially colorless material which is capable of transfer to the surface of a spirit duplicating master 14 in response to the application of pressure, heat or the like to form a substantially colorless image on the duplicating surface of the spirit master. Such colorless images are deposited, in the self-examination or grading system, to correspond to the area to be marked in the correct answer to the question on the examination paper.

The master with the image containing the colorless water and/or alcohol soluble material can be mounted on a conventional spirit duplicating machine for the production of multiple copies by first wetting the surfaces of the copy sheets with water and % or alcohol, referred to generally as a spirit fluid, and then bringing the wetted surfaces of the copy sheets into contact with the imaged surface of the master whereby colorless material is leached for transfer from the imaged master to the copy or examination sheets to produce the corresponding substantially colorless or concealed image on the copy or examination sheets.

Thereafter, when the copy or examination sheet is marked with a marking device formulated with a substance that reacts with the colorless material in the image, a visible image will develop in the copy or examination sheet indicating the right selection or answer while no visible image will develop when other areas corresponding to the wrong selection or answer are marked.

The following are representative of water and/or alcohol soluble substantially colorless color forming components A which may be formulated into the transfer coating 12 to define the invisible image on the spirit master and on the copy sheets, and the corresponding marking material B which can be used to mark the copy imaged with the material A:

| Material A: | Material B: |
|---|---|
| Gallic acid | Ferric chloride. |
| Pyrogallic acid | Ferric chloride. |
| Nickel acetate | Dithiooxamide. |
| Copper acetate | Do. |
| Copper chloride | Do. |

It is desirable to incorporate a sufficiently high concentration of the invisible color forming ingredient A into the transfer coating to enable the preparation of a large number of copies, but it is undesirable to incorporate so much as to destroy the flowability of the composition for application as a coating and to undesirably affect the transfer characteristics of the formed coating from the transfer sheet to the master sheet. In general, the amount of ingredient A incorporated will depend upon the ability to maintain sufficient fluidity or flow of the coating composition to achieve the desired coverage. It is desirable to make use of a coating composition containing the color forming component A in an amount in excess of 15% by weight and preferably in an amount within the range of 35% to 55% by weight. An amount in excess of 75% by weight tends to interfere with the fluidity and flow of the coating.

As the base into which the component A is incorporated, use can be made of various waxy materials, with or without plasticizer, as will be represented by the following examples:

Example 1

| | Percent by weight |
|---|---|
| Carnauba wax | 30 |
| Polysperm oil | 25 |
| Color forming component A | 45 |

Example 2

| | Percent by weight |
|---|---|
| Carnauba wax | 9 |
| Microcrystalline wax | 13 |
| Polybutene | 3 |
| Petrolatum | 6 |
| Mineral oil | 19 |
| Gallic acid | 50 |

The transfer coating composition is reduced to a molten state at a temperature of about 80–100° C. for application as a hot melt onto the surface of a paper base sheet 10 having good release characteristics, such as is customarily employed in the preparation of carbon papers. Instead of a paper base sheet, use can be made of a film of metal, such as aluminum, or a foil of plastic, such as Mylar, polyvinylidene chloride, Pliofilm and the like. Application is made in coating weights of about 10–20 pounds per 3,000 square feet of surface area.

In use, the transfer sheet 16 is positioned with the coated side 12 in surface contact with the duplicating surface of a spirit master 14. Transfer of coating from the areas adapted to correspond to the marking for the right answer is effected either by stylus, typewriter key 20, die, impression die and the like impacting or pressure means, or by heat or radiations 22 of an original while in surface contact with the transfer sheet for absorption of the rays in the original to generate a heat pattern which causes transfer of the corresponding portions of the coating, as described in the Roshkind Patent No. 2,769,391.

Thereafter, the master, imaged with the substantially colorless material A, can be mounted on a conventional spirit duplicating master whereby copy paper 30, wet on the surface with a spirit fluid, is brought into contact with the imaged surface of the master to leach colorless material from the image for transfer to the corresponding portions 32 of the copy sheet.

Thus no marking appears visible to the naked eye in the imaged copy sheet until the marking material B is applied onto the invisible image 32 for reaction therebetween to produce the colored markings 34.

The marking material B can be formulated into a fluid composition for writing onto the copy sheets with a marking pen, as illustrated by the following marking fluid:

| | Percent by weight |
|---|---|
| Methanol | 97–99 |
| Color forming component B | 1–3 |

Use can be made of other rapidly drying solvents or diluents in which the color forming component B is soluble, such for example as alcohols, ethers, esters, ketones and the like. The color forming composition can be formulated into a fluid composition in an amount sufficient to react to form the color reaction with the component A in the invisible image. It is desirable, however, to make use of component B in an amount greater than 0.2% by weight and preferably in an amount within the range of 0.5–5% by weight, but more can be employed.

For purposes of also indicating when the subject has marked the wrong answer, it is preferred to formulate the marking fluid or material with a tinctorial agent having a color which preferably differs from the color that is formed by reaction between components A and B. For this purpose, the marking fluid or material can be formulated to contain a dye-stuff in an amount within the range of 0.005–0.1% by weight or a tinctorial agent in the form of a pigment in an amount within the range of 0.001–0.2% by weight, as illustrated by the following example:

| | Percent by weight |
|---|---|
| Color forming component B | 0.5–5 |
| Calcofast Spirit Yellow G | 0.005–0.1 |
| Remainder alcohol. | |

Thus when the yellow marking fluid is applied to the wrong space, a yellow indication 36 will remain. When, on the other hand, it is applied to the area covered by the invisible image 32, a brown, black or other indication 34 will develop on the yellow background.

In the preferred practice of this invention for self-examination or grading, it is desirable to prepare the copy sheet to contain both the visible image 40, such as to set forth the instructions, the questions and the boxes in which the answers are to be given and also to prepare the copy sheet with the invisible concealed image in the box or area to be marked with the right answer.

For this purpose, use is made of a conventional spirit carbon 50 to image the master in the manner described to provide a spirit soluble dye image on the master with such dyes as crystal violet and the like.

Transfer is made from the spirit carbon to the surface of the spirit master in the manner described or in the conventional technique for imaging the spirit master. Such transfer is effected separate and apart from the imaging of the same master or another master with the spirit carbon containing the colorless imaging material in the transfer coating as heretofore described.

As indicated above, two spirit masters can be prepared with one imaged with the visible imaging material and the other with the invisible concealed imaging material with proper orientation to deposit their respective images onto the copy sheet. It is preferred to effect transfer of the spirit carbon 50 to form the visible image and the spirit carbon 16 to form the invisible image onto one and the same master. Thus the master will be imaged with two separate carbons to apply the visible image from one carbon sheet and the invisible image from another with the invisible image being oriented on the master sheet to occupy the spaces within the visible box or boxes corresponding to the correct answers.

Thereafter the composite master sheet containing both the visible image and the concealed image can be mounted on a spirit duplicating machine for the production of multiple copies by first wetting the surfaces of the copy sheets with a spirit fluid and pressing the wetted surfaces into contact with the imaged master to leach both the visible dyestuff from the visible image and the invisible material A from the invisible image for simultaneous transfer from the master to the copy sheets.

The copy sheets 30 that are produced will thereby embody the readable image 40 and a concealed image 32 in one or more locations for receiving marking material B when the right answer is selected. Thus the subject tested or under self-examination can read the instructions and read the questions and mark the paper in the space which he has selected for his answer. If the answer is wrong, it will become immediately obvious by reason of the lack of development of a color change but the mark which is made will remain for grading purposes. If the selection is correct, the marking material inscribed by the subject in the space provided for the answer will immediately react with the concealed material A to indicate that the answer selected is the correct answer. If the subject marks more than one space for any question, this too will be indicated by the discolorations resulting from the application of the marking material to the other spaces.

Thus the subject will be advised immediately as to whether or not the answers which he has selected are correct thereby to provide a simple and efficient self-examination procedure and as a feed-back for constructive learning. Similarly, the right and wrong answers which may be selected will remain visible with the inability of the subject to erase the wrong answers for grading purposes.

The described spirit duplicating system including the transfer sheet containing the substantially colorless material, the plural imaged master and the copy sheets containing the visible and invisible image presents a very convenient and economical self-examination and self-grading system which is adapted for mass usage with conventional and readily available, low cost duplicating systems, which can be operated by relatively inexperienced personnel and provides the teaching system with great flexibilities insofar as the preparation of copy and self-examination or for examination in grading purposes.

It will be understood that changes may be made in the details of construction, arrangement and operation, without departing from the spirit of the invention, especially as defined in the following claims.

We claim:

1. A copy sheet having first portions in the form of an image formed of a composition containing a water and/or alcohol soluble dyestuff of high color value and second portions in the form of a concealed image formed of a composition containing a substantially colorless water and/or alcohol soluble color forming reactant which is capable of being developed to form a colored reaction product upon application of a marking material containing the other color forming reactant and in which the visible image represents instructions, questions, statements and boxes, the latter of which are to be checked by the answer selected by the person under examination and in which the second portions are within selected ones of said boxes representing the correct answer to the respective question or statement of the corresponding visible portion.

2. In the method of producing multiple copies by spirit duplication having first portions which are visible and second concealed portions which can be developed on the copy sheets by coating with a marking material containing another color forming reactant, the steps of wetting the surfaces of the copy sheets with a spirit fluid, bringing the wetted surfaces of the copy sheets into surface contact with a spirit master having first portions imaged with a composition containing an alcohol and/or water soluble dyestuff of high color value and second portions imaged with a material containing a substantially colorless water and/or alcohol soluble component which is soluble in the same water and/or alcohol solvent as the dyestuff and which is reactive with the reactant in the marking material to produce color, and marking the copy sheet with a marking material containing the reactant which reacts with the color forming component in the concealed second portions to produce a colored reaction product whereby, when said second portion is marked, a visible image is immediately developed.

3. The method as claimed in claim 2 in which the marking material is formulated to contain a visible tinctorial agent visibly to indicate where the marking material has been applied.

4. In the method of producing multiple copies by spirit duplication having first imaged portions which are visible and second concealed imaged portions which can be developed on the copy sheet by coating with a marking material containing another color forming reactant which reacts with the material in the concealed image to develop color, the steps of wetting the surfaces of copy sheets with a water and/or alcohol fluid, bringing the wetted surfaces of the copy sheets having the visible first imaged portions thereon into surface contact with a spirit master having second imaged portions imaged with a material containing a substantially colorless water and/or alcohol soluble component which is reactive with the reactant in the marking material to produce color, marking the copy sheet with a marking material containing the reactant component in the concealed second portions to produce a colored reaction product whereby, when said second portion is marked, a visible image is substantially immediately developed.

References Cited

UNITED STATES PATENTS

| 2,618,866 | 11/1952 | Adams | 35—9 |
| 3,363,336 | 1/1968 | Skinner | 35—48 |
| 1,866,545 | 7/1932 | Cohen | 35—9 |
| 2,386,872 | 10/1945 | Lewis | 101—149.4 |
| 2,936,707 | 5/1960 | Maguire et al. | 101—149.5 |
| 3,076,406 | 2/1963 | Florence | 101—149.5 |

DAVID KLEIN, *Primary Examiner.*

U.S. Cl. X.R.

35—48; 101—463, 469, 471

UNITED STATES PATENT OFFICE

CERTIFICATE OF CORRECTION

Patent No. 3,451,143             Dated June 24, 1969

Richard E. Thomas et al.

It is certified that error appears in the above identified patent and that said Letters Patent are hereby corrected as shown below:

Column 6, line 31, after "reactant" insert --- which reacts with the color forming ---.

SIGNED AND
SEALED
DEC 2 - 1969

(SEAL)
Attest:

Edward M. Fletcher, Jr.
Attesting Officer

WILLIAM E. SCHUYLER, JR.
Commissioner of Patents